(12) United States Patent
Song (10) Patent No.: US 6,468,164 B2
(45) Date of Patent: Oct. 22, 2002

(54) CONSTANT VELOCITY JOINT HAVING FIXED CENTER AND CROSSED GROOVES

(75) Inventor: Zexi J. Song, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/785,031

(22) Filed: Feb. 16, 2001

(65) Prior Publication Data

US 2001/0046900 A1 Nov. 29, 2001

Related U.S. Application Data

(60) Provisional application No. 60/183,007, filed on Feb. 16, 2000.

(51) Int. Cl.$^7$ ............................................. F16D 3/224
(52) U.S. Cl. ...................................... 464/144; 464/906
(58) Field of Search ................................ 464/144, 145, 464/146, 906

(56) References Cited

U.S. PATENT DOCUMENTS

| | | | |
|---|---|---|---|
| 2,046,584 A | 7/1936 | Rzeppa | |
| 2,047,660 A | * 7/1936 | Anderson | .................... 464/144 |
| 3,176,477 A | 4/1965 | Mazziotti | |
| 3,879,960 A | 4/1975 | Welschof et al. | |
| 3,908,400 A | 9/1975 | Takahashi et al. | |
| 4,589,857 A | 5/1986 | Okoshi | |
| 5,531,643 A | 7/1996 | Welschof | |
| 5,647,800 A | 7/1997 | Warnke et al. | |

OTHER PUBLICATIONS

Industry & Technology Patents Profiles, Automotive, Vehicle Driveline, International Edition, Week Range 199941 to 199944, ISSN: 1463–4015, pp. 26—"Vehicle Axle Constant Speed Joint Minimizing Point Loading", 1999–519759/44, Sugiura, Sep., 1999.

* cited by examiner

*Primary Examiner*—Greg Binda
(74) *Attorney, Agent, or Firm*—Edmund P. Anderson (57) ABSTRACT

A constant velocity joint comprises an outer race, an inner race, a plurality of balls and a cage. The outer race and inner race have crossed grooves of multiform length. The outer race grooves and the inner race grooves are circumferentially spaced and paired to hold the balls. The central planes of paired grooves are inclined from the longitudinal direction and are crossed relative to one another. The outer race, inner race and cage having mating part-spherical surfaces that accommodate joint angulation while supporting the components against axial stroking about a fixed center. The grooves have a substantially uniform depth along their lengths including toward the closed end of the outer race to provide full support to the balls at high joint angles.

12 Claims, 8 Drawing Sheets

CONSTANT VELOCITY JOINT HAVING FIXED CENTER AND CROSSED GROOVES

REFERENCE TO RELATED APPLICATIONS

This application is based upon, and claims the benefit of, U.S. Provisional Patent Application No. 60/183,007 filed Feb. 16, 2000.

BACKGROUND OF THE INVENTION

1. Technical Field

This invention relates to constant velocity joints of the Rzeppa type and more particularly to those for use in front wheel drive vehicle applications.

2. Related Art

Prior art constant velocity universal joints are known from U.S. Pat. No. 2,046,584 issued Jul. 7, 1936 to A. H. Rzeppa. So-called "Rzeppa" universal joints include an outer race, an inner race, and a plurality of balls retained in each of the races in a pair of opposed arcuate groove sets formed lengthwise of the respective inner and outer races. A cage receives the balls. In a Rzeppa universal joint, the lengthwise centers of the outer race and inner race grooves are offset by substantially equal amounts on the opposite sides of a central plane of the joint, such that the joint will operate at a constant velocity through a wide range of joint angles. While suitable for their intended purpose, in present day applications the degree of angulation required of such joints can be so great that when the balls travel to the inward closed end of the joint, there is inadequate groove depth of either the outer race groove or inner race groove to properly support the balls under heavy torque loads. Such insufficient support can produce undesired large contact stresses between the balls and the grooves at high joint angles.

U.S. Pat. No. 3,879,960 discloses a joint where the open portion of the outer race grooves and the closed portion of the inner race grooves are made straight to accommodate a large joint angle while containing the balls. However, the outer race grooves at the closed end still have a shallow depth as in a conventional "Rzeppa" joint and the inner race groove at the closed end tends to get shallower than the conventional "Rzeppa" joint because of the straight groove configuration.

U.S. Pat. No. 4,589,857 discloses a joint where the centers of the outer and inner race spherical surfaces are offset by an equal amount on opposite sides of the central plane of the joint, and further where the groove centers of the inner and outer race are offset. Such a configuration provides only a modest gain in groove depth at the closed end while sacrificing cage web strength.

It is an object of the present invention to improve upon such joints to provide both high angularity and strength to the joint.

SUMMARY OF THE INVENTION AND ADVANTAGES

A constant velocity joint constructed according to the invention includes an outer race having an inner partial spherical concave joint surface disposed about a longitudinal axis of the outer race. A first plurality of circumferentially spaced grooves are formed in the joint surface of the outer race and extend generally longitudinally of the outer race between an open end of the outer race and a closed end. An inner race is disposed in the outer race and has an outer partial spherical convex joint surface disposed about a longitudinal axis of the inner race. A second plurality of circumferentially spaced grooves are formed in the joint surface of the inner race and extend generally longitudinally of the inner race between the open and closed ends of the outer race. Each of the grooves of the second plurality are arranged opposite a corresponding one of the grooves of the first plurality to define a plurality of paired ball groove sets. A plurality of torque-transmitting balls are disposed in the plurality of ball groove sets for movement therealong during relative angulation of the inner and outer races. A ball cage is disposed between the inner race and the outer race and is formed with a plurality of windows supporting the balls in a common ball plane during movement of the balls along the groove sets. The ball cage has an outer convex partial spherical joint surface constrained against relative axial movement by the inner joint surface of the outer race. The ball cage has an inner concave partial spherical joint surface constrained against relative axial movement by the outer joint surface of the inner race. Each groove of each ball groove set has an associated lengthwise extending groove plane. The groove planes of the grooves of each of the ball groove sets are disposed in transverse crossing relation to one another.

The invention has the advantage of providing a fixed center, non-stroking universal joint capable of achieving high joint angulation with exceptional support of the balls at the closed end of the joint. A joint constructed according to the invention is capable of achieving a joint angle of 55°, whereas a conventional "Rzeppa" joint is limited to joint angles of about 46°. Moreover, the cross-groove joint constructed according to the invention provides substantially greater groove depth at the closed end of the joint than that of the "Rzeppa" joints for proper support of the balls at the high angles, without sacrificing the strength of the ball cage.

The invention has the further advantage of being simple to manufacture and of offering a variety of groove configuration alternatives which achieve the stated objectives of high joint angulation and excellent ball support at such high angles.

According to further advantages, the joint construction of the present invention provides a large groove depth at the open end of the outer race which remains uniform to the closed end. A characteristic ball center motion relative to cage window enables an increase in the cage internal diameter. Accordingly, the depth of the groove at the closed end of the inner race can also be adjusted to an appropriate degree by increasing the inner race sphere diameter.

According to a particular embodiment of the invention, the central line of each groove is a combination of an arc and a tangent straight line. At zero joint angle, the central planes of each groove pair are symmetrically inclined from the joint axis in the radial direction to ensure smooth angulation and constant velocity of the joint.

According to further embodiment, the groove pairs are either continuously curving or are substantially linear along their lengths to alter the characteristics of the joint while achieving the same objectives discussed above.

THE DRAWINGS

Presently preferred embodiments of the invention are disclosed in the following description and accompanying drawings, wherein.

DETAILED DESCRIPTION

Figure 1:
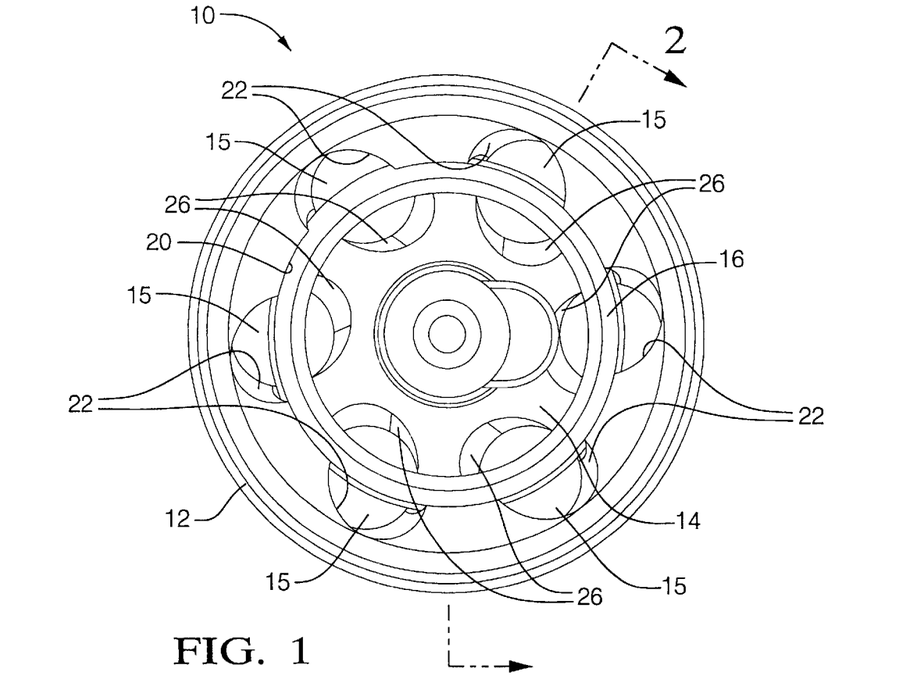
FIG. 1 is an end elevation view of a constant velocity joint according to the present invention.
Figure 2:
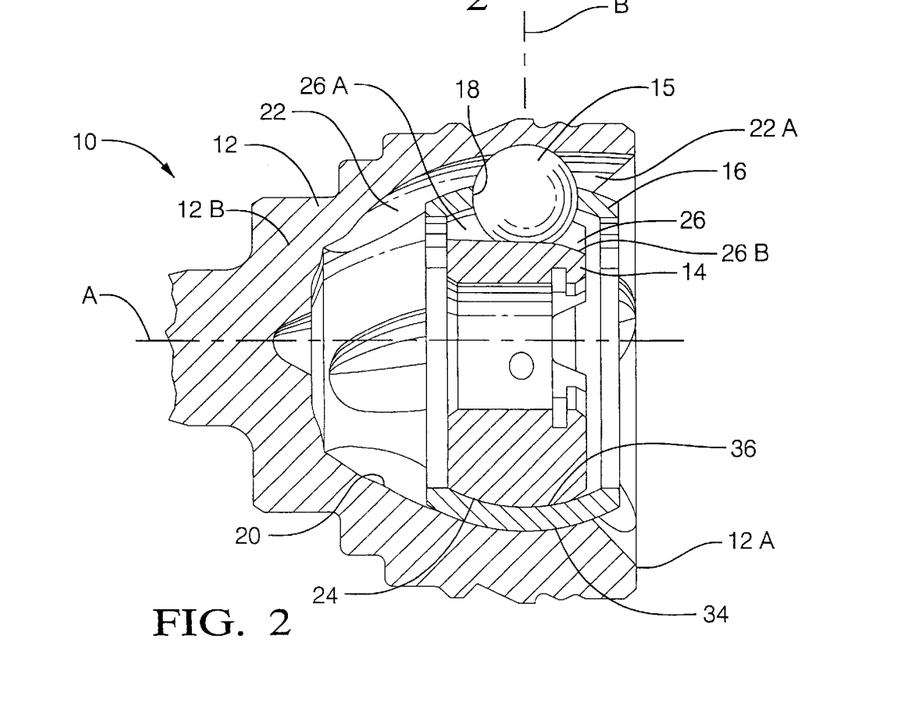
FIG. 2 is a sectional view taken generally along lines 2—2 of FIG. 1.

FIGS. 1 and 2 illustrate a fixed-center, cross groove constant velocity joint 10 constructed according to a first embodiment of the invention. The joint 10 comprises an outer race 12, an inner race 14 disposed in the outer race, and a cage 16 disposed between the outer race 12 and the inner race 14. The components 12, 14, 16 are constrained in the longitudinal direction along an axis A of the joint 10 by mating part-spherical joint surfaces to be described below, such that the components 12, 14, 16 are non-stroking in the axial direction of the joint.

Figure 9:
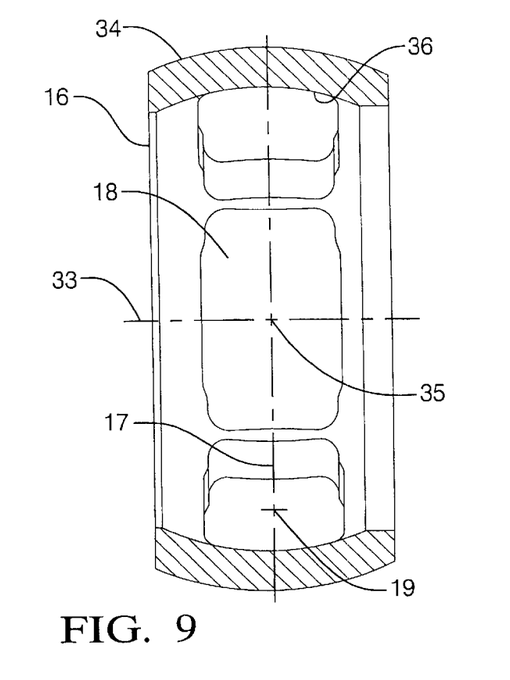
FIG. 9 is a sectional view a the ball cage according to one embodiment thereof.
Figure 10:
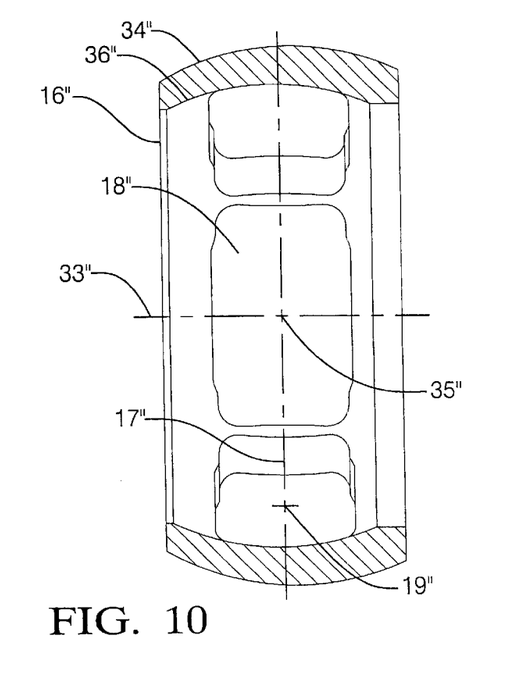
FIG. 10 is a sectional view like FIG. 9 but of an alternative cage configuration.

The cage 16 is formed with a plurality of cage windows 18 in which a corresponding plurality of load-bearing balls 15 are accommodated for constraining the balls 15 in a common ball plane B through all joint angles, such that the centers of the balls 15 always lie on a cage central plane 17 passing through the windows 18 of the cage 16 (FIGS. 9 and 10).

The outer race 12 includes an inner partial spherical concave joint surface or outer race sphere 20 disposed about a longitudinal axis 21 of the outer race 12. A plurality of generally longitudinally directed grooves 22 are formed in the outer race sphere 20 at circumferentially spaced locations, as best shown in FIGS. 1–4. The longitudinal center of the outer race sphere 20 is shown at 41 in FIGS. 3 and 4.

Figure 3:
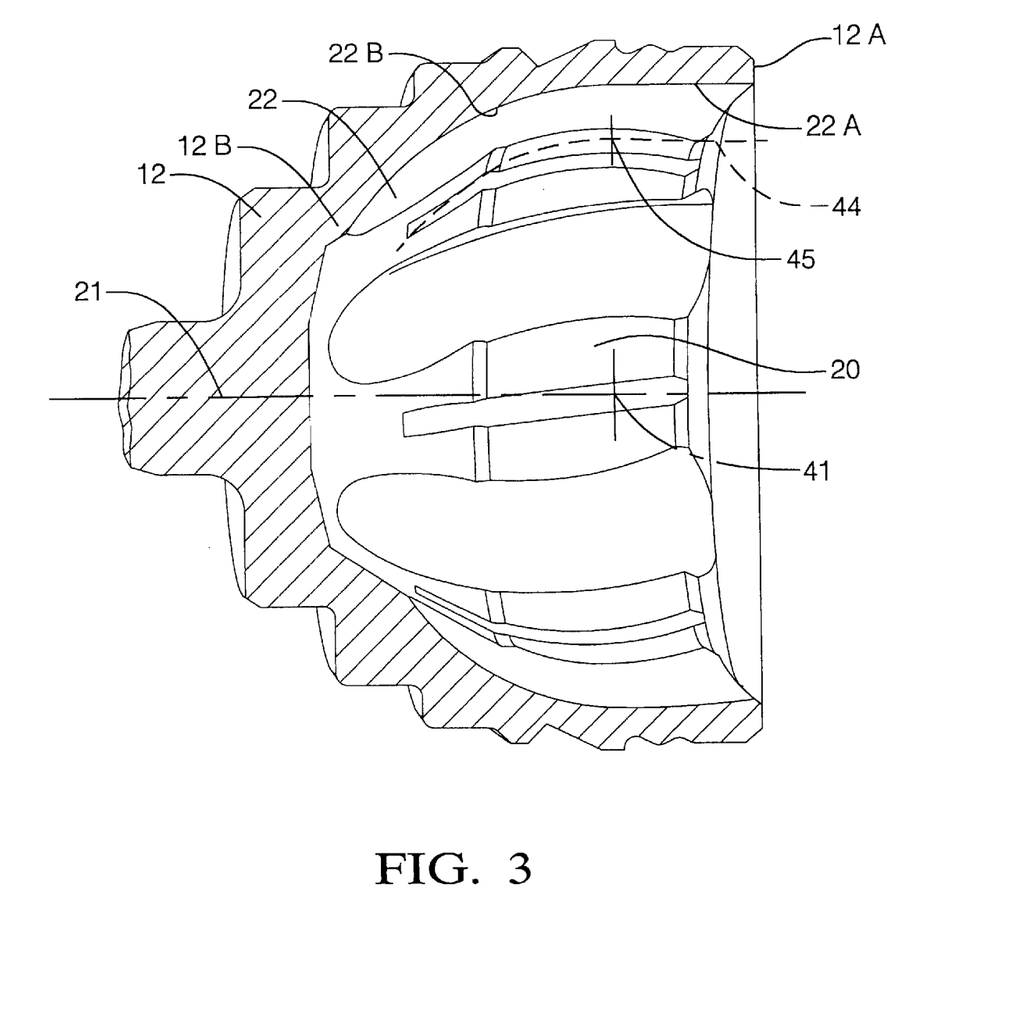
FIG. 3 is a sectional view like FIG. 2 but of only the outer race.

Each groove 22 has a straight or linear section 22A and a curving or arcuate section 22B. The straight section 22A extends outwardly to an open end 12A of the outer race 12. The arcuate section 22B extends tangentially inwardly from the straight section at a medium point 45 toward a closed end 12B of the outer race 12 (FIG. 3). The grooves 22 have a substantially uniform depth at the arcuate section 22B between the opposite ends of the grooves 22.

The inner race 14 has an outer partial spherical convex joint surface or inner race sphere 24 in which a plurality of grooves 26 are formed. Each groove 26 has a straight or linear section 26A at the inboard end thereof that is tangent to a curving or arcuate section 26B at the open end of the outer race 12. The grooves 26 have a substantially uniform depth at the arcuate section 22B.

Figure 4:
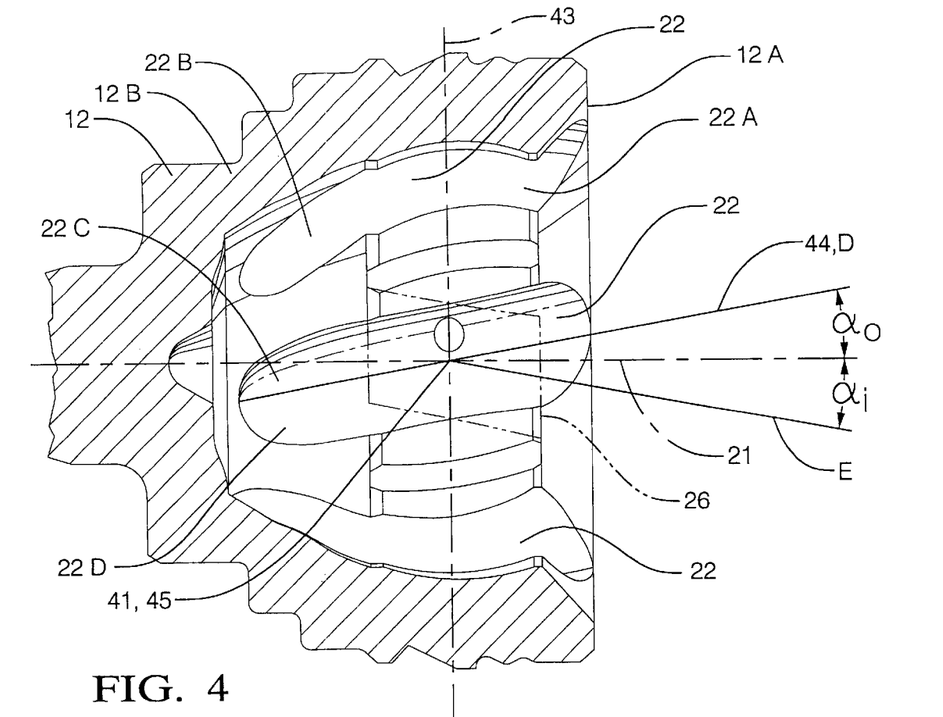
FIG. 4 is a sectional view taken generally along lines 4—4 of FIG. 1 but showing only the outer race.

An outer race central plane 43 (FIG. 4) passes through the outer race sphere center 41 and is perpendicular to the outer race axis 21. As a ball 15 moves along the length of outer race groove 22, a trace of the ball center defines an outer race groove central line 44 (FIG. 3). An outer race groove central plane D (FIG. 4) contains the outer race groove central line 44. The outer race groove central line 44 intersects the outer race central plane 43 at a medium point 45 (FIGS. 3 and 4). As best shown in FIG. 4, the central plane D of each outer race groove 22 is inclined to the outer race axis 21 at a tip angle $\alpha_o$. In other words, when viewing the outer race 12 in section perpendicular to its longitudinal axis 21 as in FIG. 4, the grooves 22 extend cross-wise to the longitudinal axis 21 at the prescribed angle $\alpha_o$ and as such are transverse and non-parallel in the longitudinal direction. The cross-point, or intersection point with the longitudinal axis 21 is located at the medium point 45.

Figure 5:
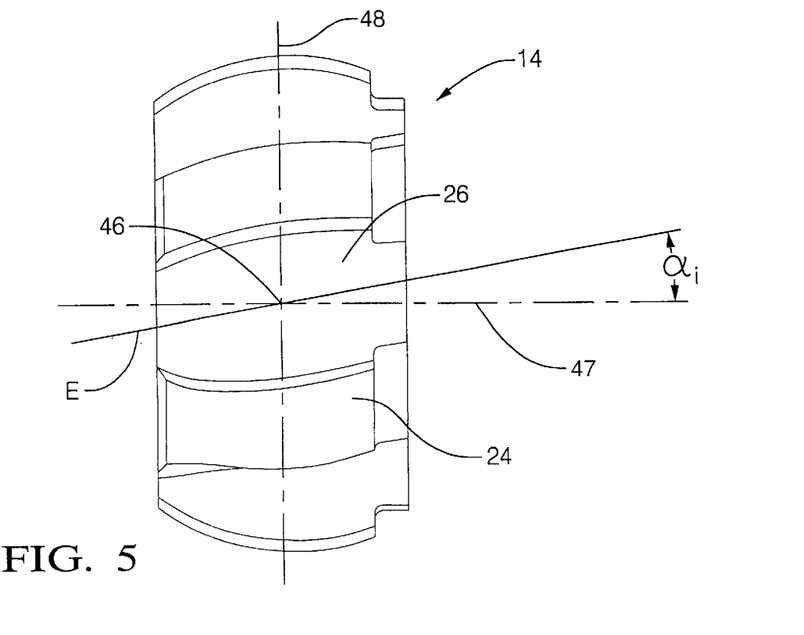
FIG. 5 is an elevational view of the inner race.
Figure 6:
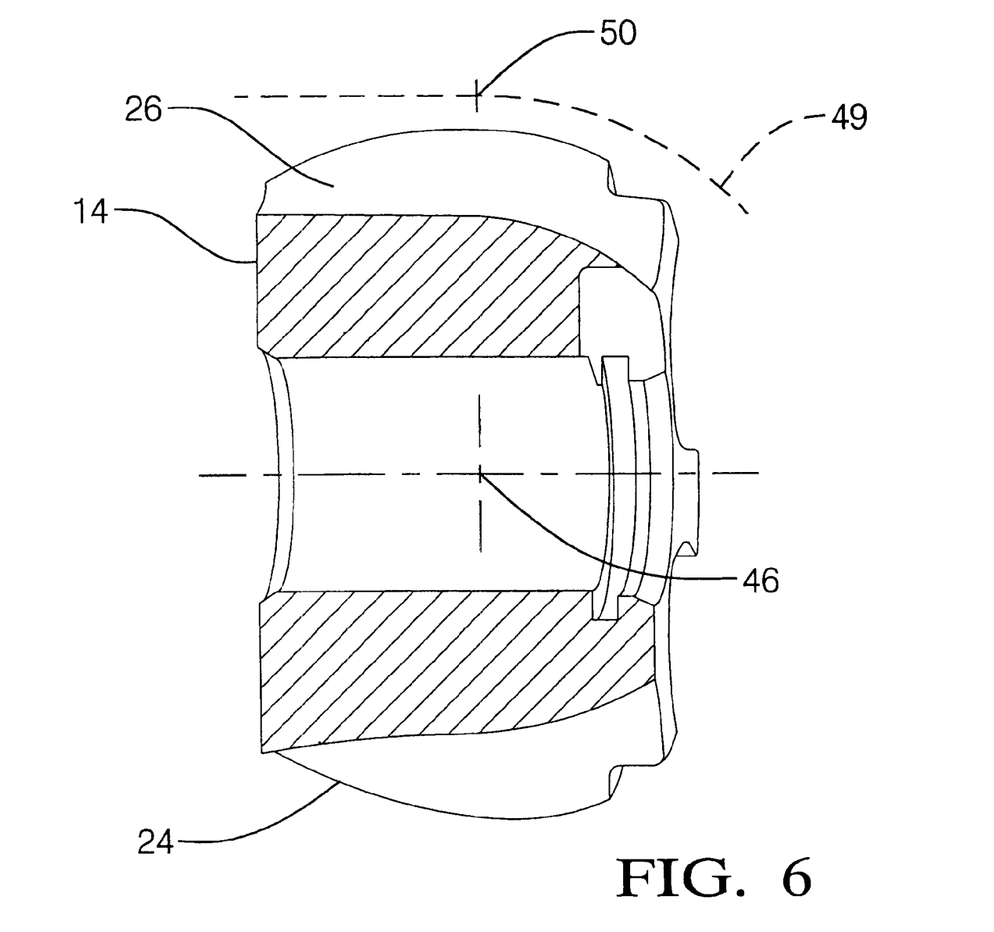
FIG. 6 is a sectional view of the inner race.

The inner race 14 has a center point at 46. An inner race central plane 48 passes through the inner race sphere center 46 and is perpendicular to a longitudinal axis 47 of the inner race 14. As a ball 15 moves along the length of the inner race groove 26, the trace of the ball center is defined an inner race groove central line 49 (FIG. 6). An inner race groove central plane E contains the inner race groove central line 49. The inner race groove central line 49 intersects the inner race central plane 48 at a medium point 50 (FIG. 6). The central plane E of each inner race groove 26 is inclined to the longitudinal axis 47 of the inner race 14 at a tip angle $\alpha i$ which is the same value as the tip angle $\alpha_o$ of the outer race 12, but oppositely directed, as best shown in FIGS. 4 and 5. In other words, the grooves 22 and 26 are inclined to the axes of the outer and inner races 12, 14 to the same degree when the joint 10 is at zero joint angle, but in opposing directions such that they cross one another. Each groove 22 from the outer race 12 is matched with a corresponding groove 26 from the inner race 14 to form a plurality of matched groove pairs or sets in which the balls 15 are disposed. The grooves 22, 26 from each groove set are angled relative to the longitudinal axes of the races, and are further angled relative to one another such that their respective groove center planes D, E are disposed in transverse crossing relation to one another.

As shown best in FIG. 9, the cage 16 has an outer partial spherical convex joint surface or outer cage sphere 34, and an inner partial spherical concave joint surface or inner cage sphere 36. The outer surface 34 confronts and is supported for relative angular movement by the inner surface 20 of the outer race 12. The mating part-spherical surfaces 34, 20 cooperate to support the cage 16 against axial movement or stroking in the longitudinal direction relative to the outer race 12. Similarly, the inner part-spherical surface 36 of the cage 16 confronts and reacts with the outer part-spherical surface 24 of the inner race 14 to support the cage 16 and inner race 14 against relative longitudinal stroking movement. As such, the joint 10 is non-stroking and has a fixed center. The cage 16 has a plurality of cage windows 18 as previously mentioned which are rectangularly shaped with curved corners and circumferentially located around a cage axis 33 as shown in FIG. 9 or FIG. 10. The cage central plane 17 is perpendicular to the cage axis 33 and passes through the centers 19 of all cage windows 18. The intersection of the cage central plane 17 and the cage axis 33 is at the cage center point 35.

As shown in the embodiment of FIGS. 1–6, the centers of the part-spherical surfaces 20, 24, 34, and 36 arc configured to be coincident and thus have a common center at the center point 35 of the cage 16. The groove central planes D, E are arranged to intersect one another in the central cage plane 17 at all angles of the joint 10. This arrangement of the planes D, E is present in the subsequent embodiments as well (FIGS. 9 and 10).

In the illustrated embodiment of FIGS. 1–6, the depths of the grooves 22, 26 that provide support to the balls 15 during torque transmission at all angles is substantially uniform along the length of the grooves 22, 26, and particularly in the vicinity of the closed end 12B of the outer race 12, to provide non-varying support to the balls 15 at all joint angles, and particularly at high maximum or near-maximum joint angles approaching 55°. In contrast, the grooves of "Rzappa"-type universal joints get characteristically shallower toward the closed end of the outer race at the critical point where maximum ball groove forces occur at maximum joint angle approaching 46° for such prior joints.

Figure 7A:
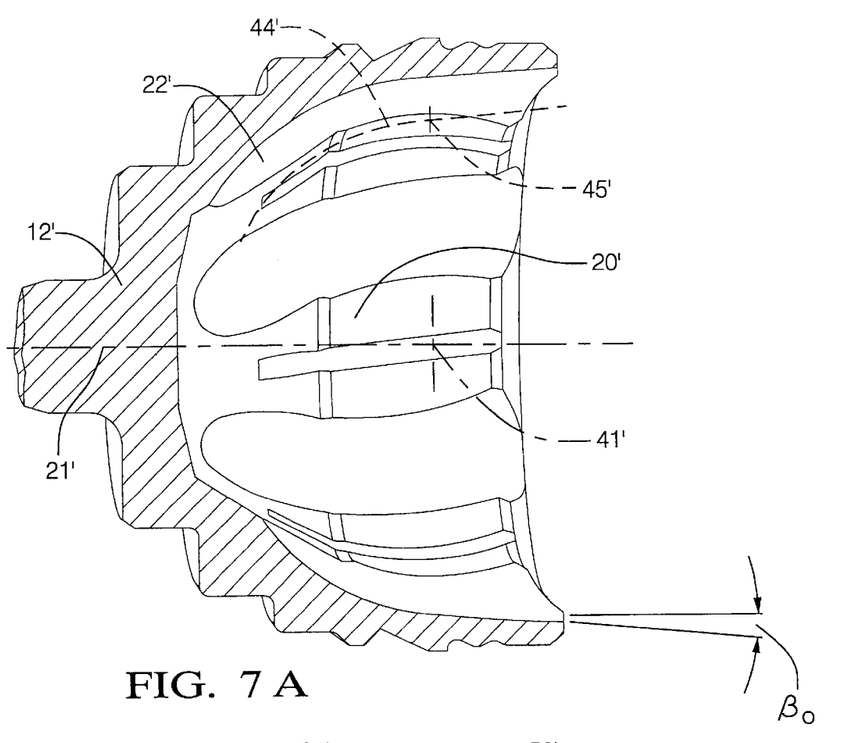
FIGS. 7A and 7B are sectional views of an alternative groove configuration of the outer and inner races.
Figure 7B:
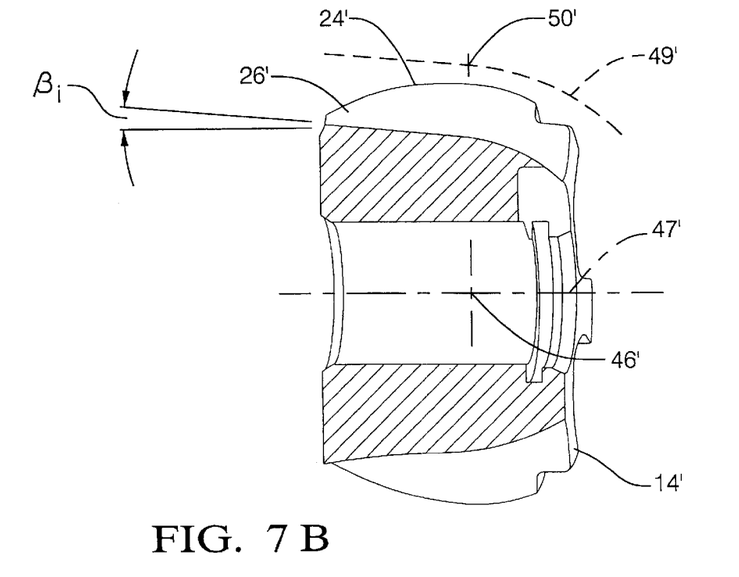

FIGS. 7A and 7B show an alternative configuration of the inner and outer race grooves, which are substantially identical in all respects to the grooves 22, 26 described previously with respect to FIGS. 1–6, except that the straight sections 22A', 26A' are further angled radially toward or away from the axes 21', 47' of the outer and inner races 12', 14' by respective radial angles $\beta_o$, $\beta_i$. All other features are the same and thus the same reference numerals are used to identify like features, but are primed.

With the cage 16 of FIG. 9, the cage outer sphere 34 and the cage inner sphere 36 coincide at the cage center 35. This arrangement results in a cage of uniform thickness in the lengthwise axial direction. In this case, all five centers (of outer race sphere 41, cage outer sphere 34, cage inner sphere 36 and inner race sphere 24, as well as cage center 35) in the joint coincide at the common point of the cage center 35. The medium point 45 of the outer race groove central line 44 is coincident with the medium point 50 of the inner race groove central line 49 on the cage central plane 17 under zero joint angle.

With the alternative cage of FIG. 10, the same reference numerals are used as those used in FIG. 9, but are double primed. The centers of the cage outer sphere 34" and the cage inner sphere 36" are symmetrically offset from the cage center 35" along the cage axis 33". This arrangement results from a cage having a variable thickness along it length as shown. In this case, the centers of the outer race sphere 41 and the cage outer sphere 34" are still superimposed. So are the centers of the inner race sphere 24 and the cage inner sphere 36". Each intersection point of the outer race groove central line 44 and the inner race groove central line 49 still lies on the cage central plane 17", but the medium point 45 and 50 are no longer superimposed under zero joint angle.

Figure 8A:
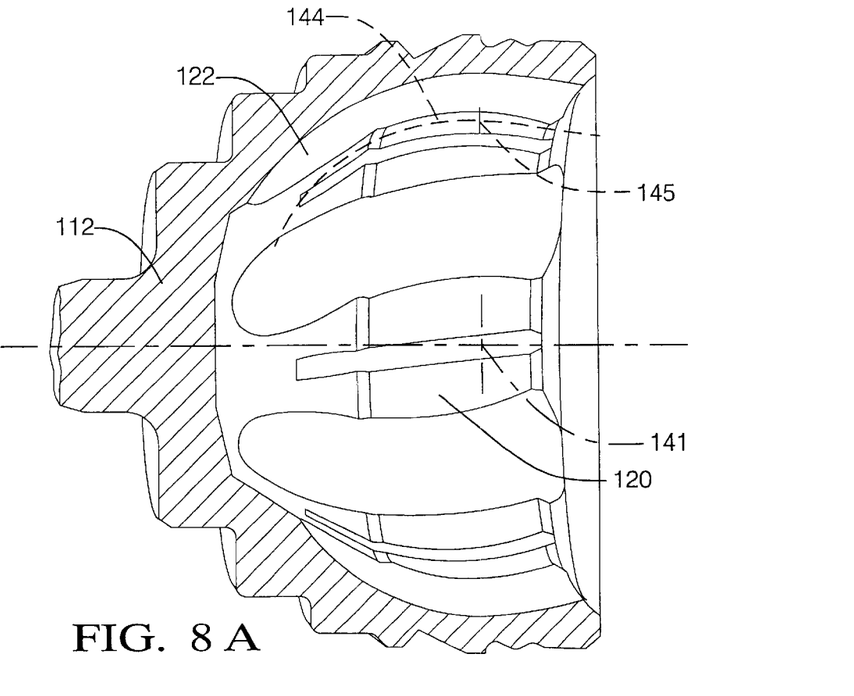
FIGS. 8A and 8B are sectional views showing an another alternative groove configuration of the outer and inner races.
Figure 8B:
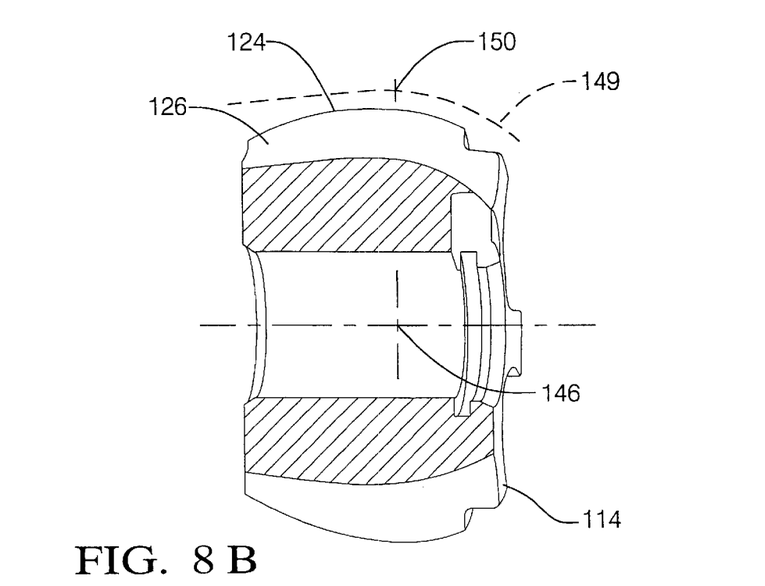
Figure 11:
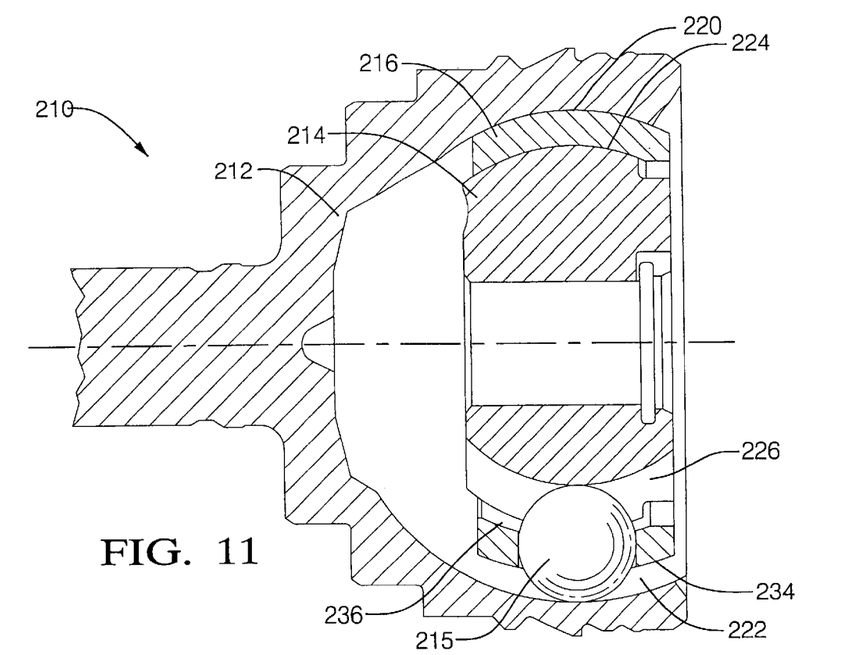
FIG. 11 is a sectional view of an alternative embodiment of the invention.

FIGS. 8A, 8B and 11 show further alternative embodiments of a joint, wherein everything described above with respect to the first embodiment of FIGS. 1–6 and the alternative cage configurations of FIGS. 9–10 applies, except that the groove configurations 122, 126 and 222, 226 of the inner and outer races, respectively, have been altered in their longitudinal shape to be substantially continuously curving or arcuate along their entire length so as to omit the straight section of the first embodiment. Accordingly, the same reference numerals are used, but are offset by 100 in FIGS. 8A and 8B and by 200 in FIG. 11. They are still cross grooves as previously described. By fully curving, it is meant that the grooves lack a straight section as in the first embodiment, and rather have a continuously curving shape that may be spherical, elliptical, or other curving, generally arcuate shapes. The fully curving grooves 122,126 and 222, 226 achieve the same objects of high joint angle and uniform groove depth of the first embodiment.

Figure 12:
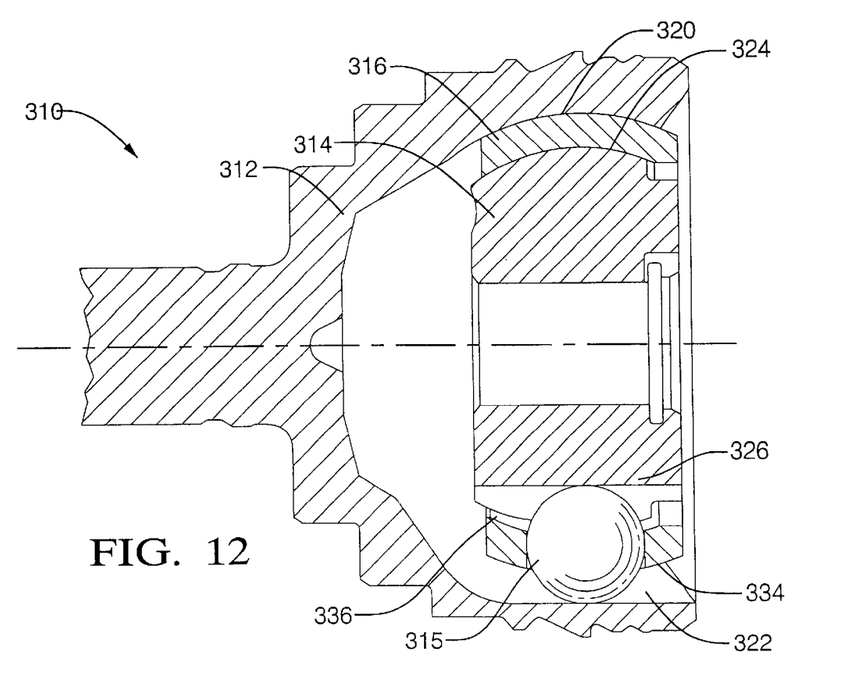
FIG. 12 is a sectional view of another alternative embodiment of the invention.

FIG. 12 shows still a further embodiment of a joint constructed according to the invention, which likewise applies in its description and operation to that described above for the first embodiment of FIGS. 1–6 and the cages of FIGS. 9 and 10, except that the groove configurations 322, 326 of the inner and outer races have been altered in their longitudinal shape to be substantially straight or linear along their length, although still crossed in the groove sets. Accordingly, the same reference numerals are used, but are offset by 300.

It will be obvious to those skilled in this field that various changes may made without departing from the scope of the present invention. The present invention is not limited to what is shown in the figures and described in the specification, but is defined by the claims.

What is claimed is:

1. A constant velocity joint comprising:
   an outer race having an inner partial spherical concave joint surface disposed about a longitudinal axis of said outer race;
   a first plurality of circumferentially spaced grooves formed in said joint surface of said outer race and extending generally longitudinally of said outer race between an open end of said outer race and a closed end of said outer race;
   an inner race disposed in said outer race, said inner race having an outer partial spherical convex joint surface disposed about a longitudinal axis of said inner race;
   a second plurality of circumferentially spaced grooves formed in said joint surface of said inner race and extending generally longitudinally of said inner race between said open and said closed ends of said outer race, each of said grooves of said second plurality being arranged opposite a corresponding one of said grooves of said first plurality to define a plurality of paired ball groove sets;
   a plurality of torque-transmitting balls disposed in said plurality of said paired ball groove sets for movement therealong during relative angulation of said inner and outer races;
   a ball cage disposed between said inner race and said outer race and formed with a plurality of windows supporting said balls in a common ball plane during said movement of said balls along said grooves of said ball groove sets, said ball cage having an outer convex partial spherical joint surface constrained against relative axial movement by said inner joint surface of said outer race, said ball cage having an inner concave partial spherical joint surface constrained against relative axial movement by said outer joint surface of said inner race;
   each groove of each ball groove set having an associated lengthwise extending groove plane; and
   wherein said groove planes of said grooves of each of said ball groove sets are disposed in transverse crossing relation to one another, and said outer race and said inner race have centers which are longitudinally offset relative to a center point of said cage.

2. The constant velocity universal joint of claim 1 wherein said groove planes of said first plurality of grooves of said outer race are disposed at a predetermined tip angle $\alpha_o$ relative to said longitudinal axis of said outer race, and said groove planes of said second plurality of grooves of said inner race are disposed at a predetermined tip angle $\alpha_I$ relative to said longitudinal axis of said inner race.

3. The constant velocity universal joint of claim 2 wherein said tip angles $\alpha_o$ and $\alpha_I$ are equal but opposite when said joint is at a zero joint angle in which said longitudinal axes of said inner and outer races are arranged in coincident relation with one another.

4. The constant velocity universal joint of claim 1 wherein said ball cage has a central cage plane passing through said cage windows, and said groove planes of each of said groove sets intersect in said central cage plane.

5. The constant velocity universal joint of claim 1 wherein said partial spherical joint surfaces of said outer race and said inner race have their centers constrained at a common center point of said cage.

6. The constant velocity universal joint of claim 1 wherein said ball grooves of said outer race are substantially linear along their lengths.

7. The constant velocity universal joint of claim 1 wherein said cage has uniform thickness in the longitudinal direction.

8. The constant velocity universal joint of claim 1 wherein said cage has a variable thickness in the longitudinal direction.

9. The constant velocity joint of claim 1 wherein said ball grooves of said outer race includes a linear section extending outwardly to said open end of said outer race and an arcuate section extending tangentially inwardly from said linear section toward said closed end of said race.

10. The constant velocity universal joint of claim 9 wherein said linear section is inclined radially relative to said longitudinal axis of outer race.

11. The constant velocity universal joint of claim 1 wherein said ball grooves of said outer race are continuously curving along their lengths.

12. A constant velocity joint comprising:

an outer race having an inner partial spherical concave joint surface disposed about a longitudinal axis of said outer race;

a first plurality of circumferentially spaced grooves formed in said joint surface of said outer race and extending generally longitudinally of said outer race between an open end of said outer race and a closed end of said outer race;

an inner race disposed in said outer race, said inner race having an outer partial spherical convex joint surface disposed about a longitudinal axis of said inner race;

a second plurality of circumferentially spaced grooves formed in said joint surface of said inner race and extending generally longitudinally of said inner race between said open and said closed ends of said outer race, each of said grooves of said second plurality being arranged opposite a corresponding one of said grooves of said first plurality to define a plurality of paired ball groove sets;

a plurality of torque-transmitting balls disposed in said plurality of said paired ball groove sets for movement therealong during relative angulation of said inner and outer races;

a ball cage disposed between said inner race and said outer race and formed with a plurality of windows supporting said balls in a common ball plane during said movement of said balls along said grooves of said ball groove sets, said ball cage having an outer convex partial spherical joint surface constrained against relative axial movement by said inner joint surface of said outer race, said ball cage having an inner concave partial spherical joint surface constrained against relative axial movement by said outer joint surface of said inner race;

each groove of each ball groove set having an associated lengthwise extending groove plane; and wherein said groove planes of said grooves of each of said ball groove sets are disposed in transverse crossing relation to one another, said ball grooves of said outer race includes a linear section extending outwardly to said open end of said outer race and an arcuate section extending tangentially inwardly from said linear section toward said closed end of said race, said linear section being inclined radially relative to said longitudinal axis of outer race.

* * * * *